UNITED STATES PATENT OFFICE.

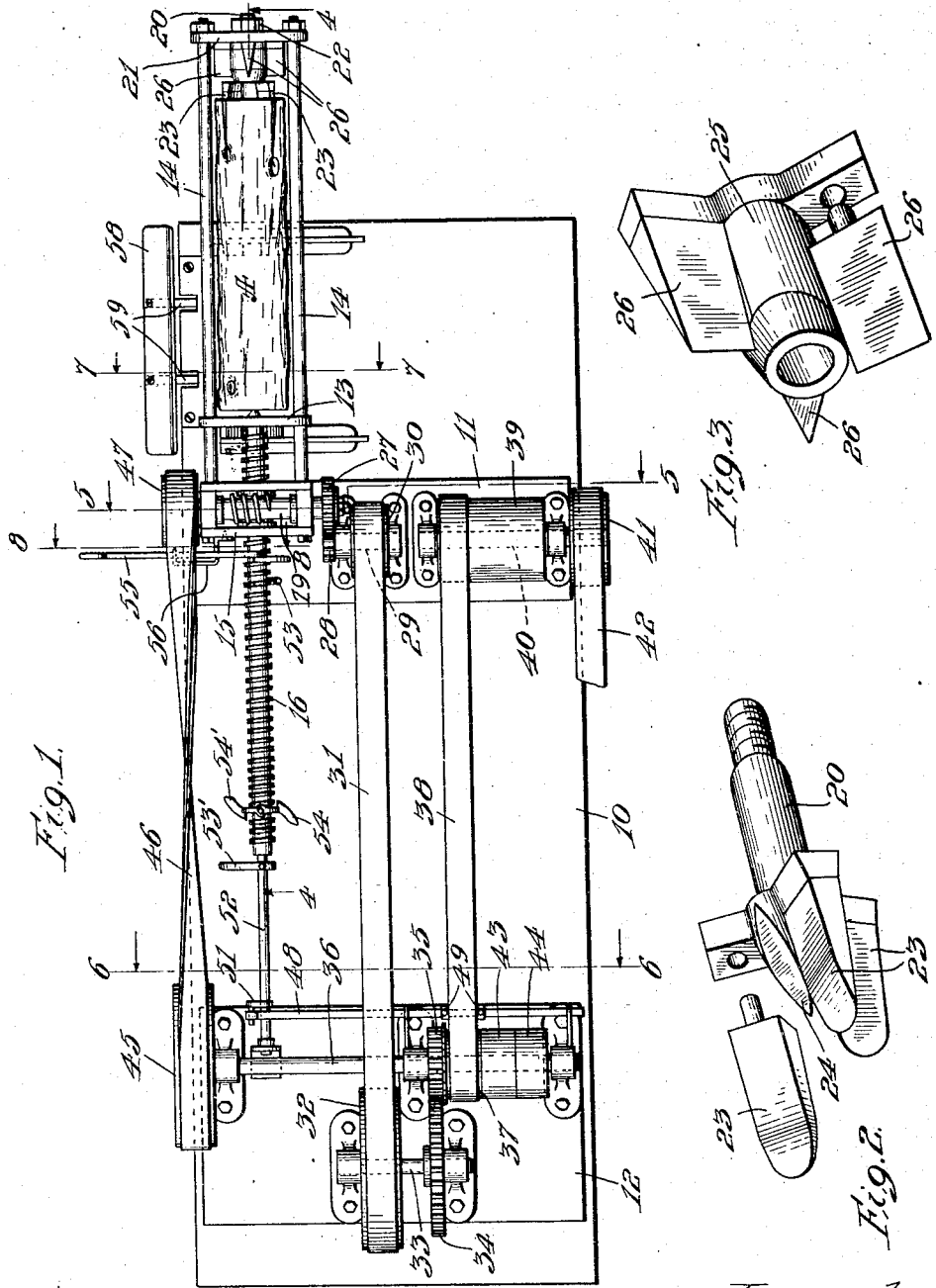

FRANK PETER, OF CHICAGO, ILLINOIS.

SPLITTING-MACHINE.

1,189,999.  Specification of Letters Patent.  Patented July 4, 1916.

Application filed March 16, 1914. Serial No. 825,047.

*To all whom it may concern:*

Be it known that I, FRANK PETER, a citizen of the United States, and a resident of the city of Chicago, county of Cook, and State of Illinois, have invented certain new and useful Improvements in Splitting-Machines, of which the following is a specification.

My invention relates to splitting machines and more specifically to a machine designed for use especially in the splitting of wood for kindling purposes.

The object of my invention is the production of a machine of the character mentioned which will be of durable and economical construction and through the medium of which the splitting of wood may be effected with ease and expedition.

Other objects will appear hereinafter.

With these objects in view my invention consists in the combinations and arrangements of parts hereinafter described and claimed.

The invention will be best understood by reference to the accompanying drawings forming a part of this specification, and in which—

Figure 1 is a top plan view of a splitting machine embodying my invention, and Figs. 2 and 3 are perspective views of the constituent parts of the cutting element of the machine detached.

The preferred form of construction as illustrated in the drawings comprises a base 10 upon the upper side of which are rigidly secured bearing plates 11 and 12. Arranged above the base 10 adjacent the plate 11 is a head 13 triangular in form which is slidably mounted upon a plurality of parallel horizontally extending guide rods 14, corresponding ends of which are secured rigidly in the plate 12 and a bearing member 15 arising therefrom as clearly shown. Coöperating with the head 13 is a stem 16, one end of which is rigidly secured in said head, being held thereby against rotation. Said end of said stem projects through the head 13 and is pointed in order to serve as a center adapted to pierce one end of the piece of wood or material A which is to be split. The arrangement is such, as will be observed, that, longitudinal movement of the head 13 upon guide rods 14 is effected by longitudinally moving the stem 16. Longitudinal movement of stem 16 is effected by means of worm and worm-wheel mechanism which is operable by means of a rotary shaft 19 mounted in bearing member 15.

Provided at the outer ends of the guide rods 14 is a cutting or splitting element consisting of a stem 20 which is secured in a plate 21 fixed to the outer ends of said guide rods by means of a nut 22. Provided at the inner end of the stem 20 is a plurality of blades 23 so arranged that the cutting edges thereof are disposed radially about a pointed center 24. Mounted upon the stem 20 for rotary adjustment thereof is a member 25 to which is secured a second set of blades 26 arranged relatively the same as blades 23 as just described.

Fixed to one end of the worm shaft 19 is a gear 27 which meshes with a pinion 28 fixed to a shaft 29 which is mounted in suitable bearings arising from the plate 11. Also fixed to the shaft 29 is a pulley 30 about which travels an endless belt 31, said belt also passing around a pulley 32 which is fixed to a shaft 33 mounted in suitable bearings arising from the plate 12. Also fixed to shaft 33 is a gear 34 which meshes with a gear 35 loosely mounted upon a shaft 36 which is mounted in suitable bearings arising from plate 12. Loosely mounted upon shaft 36, the same being fixed to gear 35 is a pulley 37 around which travels an endless belt 38, said belt also passing around a pulley 39 fixed to driving shaft 40 which is mounted in suitable bearings arising from plate 11. Upon the shaft 40 is also fixed a pulley 41 around which passes a pulley 42 for connection with any suitable source of power supply. An operative connection is thus established between the worm shaft 19 and the power shaft 40 whereby, when said driving shaft is positively rotated said worm shaft will be rotated in a direction to cause longitudinal movement of the stem 16 and hence the head 13 toward the cutting or splitting element of the machine. The gearing and belting employed to establish the operative connection between driving shaft 40 and worm shaft 19 serve simply to reduce the speed, said driving shaft, when the machine is in use being driven at a comparatively high rate of speed. When the head 13 is thus moved and with a piece of material A interposed between said head and the cutting element, said piece of material will be pressed into engagement with said cutting element, the blades 23 and 26 causing the same to be split into a number of pieces or sections as will be readily understood. The rotary adjustment afforded the member 25 permits of the blades 26 being moved into intermediate positions relative to the blades 23, in which event the piece of material will be split into six parts. By adjusting said blades 26 so that the same are in alinement with the blades 23 it is evident that the piece of material will be split into but three parts. Also arranged upon the shaft 36 are pulleys 43 and 44 the former being loose upon said shaft and the latter being fixed to said shaft. Fixed to the opposite end of shaft 36 is a pulley 45 upon which travels an endless twisted belt 46 which also passes around a pulley 47 which is fixed to the worm shaft 19. With this arrangement it will be seen that an operative connection is established between the shaft 36 and the worm shaft, and so that when the belt 38 is shifted to engage with pulley 44 the driving of said shaft from the driving shaft 40 will be effected through the medium of shaft 36 and belt 46. In this case however the worm shaft will be reversely rotated in order to effect retrograde or return movement of stem 16 and head 13. The pulleys which are involved in the latter driving connection are so proportioned that the return movement of the stem 16 and head 13 will be very rapid, the worm shaft, in this instance being driven at a much higher rate of speed than in the positive or operative movement thereof.

Coöperating with the belt 38 is a belt shifting mechanism consisting of a transversely extending shiftably mounted bar 48 from which arise spaced studs or posts 49 which engage against opposite sides of said belt as clearly shown in Fig. 1. One end of said bar 48 is engaged with the free end of a rocker arm 51 which is fixed to an oscillatory shaft 52 mounted in suitable bearings arising from plates 11 and 12. The arrangement is such that said shifting bar 48 may be actuated by oscillating said shaft 52 as will be readily understood. Provided upon said shaft adjacent the opposite ends thereof are laterally projecting curved arms 53 and 53', and fixed to the stem 16 are laterally projecting cam members 54 and 54' arranged to coöperate respectively with said arms 53 and 53'. The arrangement is such that in the operation of the machine, as the stem 16 approaches either terminal of its movement the cam member 54 will engage with the arm 53 or the cam member 54' will engage with the arm 53' and thereby cause outward rocking of the arm engaged in order to effect oscillation of shaft 52 and hence actuation of the shifting mechanism in order to shift the belt 38 into engagement with the idler or loose pulley 43. In other words, with this arrangement as the cutter head 13 approaches its terminals of movement the belt 38 will be automatically shifted to engagement with the pulley 43 in order to stop the machine. Coöperating with the rocker shaft 52 also is a manually movable bar 55 which is mounted in bearings 56, said bar being operatively connected at its inner end with said shaft so that rocking of the latter may be manually effected. This arrangement affords means for oscillating the shaft 52 from its neutral position in order to actuate the belt shifting mechanism to move the belt 38 into engagement with pulleys 37 or 44 to secure positive or reverse operation of the machine.

The pieces of material A to be split are elevated to and supported in position for engagement by the head 13 and cutter blades 23 and 26 by means of a mechanism which is capable of manual operation by means of a pedal 58 provided at the outer ends of pivoted levers 59.

With a construction as set forth then, it will be seen that the members A which it is desired to split are placed upon the base 10 and slid or rolled onto the elevating mechanism and elevated to operative position between the head 13 and the splitting blades by depression of pedal 58. The bar 55 is then manually shifted by the operator to shift the belt 38 into engagement with the pulley 37 in which event the driving mechanism will operate to feed the stem 16 and hence the head 13 toward the member A. Said head 13 will press the member A into engagement with the blades 23 and 26 which will effect splitting thereof into a plurality of pieces of desired size for kindling or other purposes as will be readily understood. As the head 13 approaches its terminal of movement in this direction the cam member 54 will engage with the arm 53 and cause shifting of belt 30 to engagement with the loose pulley 43, thereby effecting cessation of the operation of the machine. The operator, through operation of the member 55, will then effect shifting of the belt 38 into engagement with the pulley 44, in which event the driving mechanism will be reversely rotated at an increased speed to secure a rapid return or retrograde movement of stem 16 and the head 13. As said stem and head approach the terminal of their return movement the cam member 54' will engage with the arm 53' and thereby effect automatic shifting of belt 38 to engagement with loose pulley 53 and hence again effect stopping of the operation of the machine. This course of operation is repeated in the splitting of the successive members A.

While I have illustrated and described the preferred form of construction for carrying my invention into effect, this is capable of variation and modification without departing from the spirit of the invention.

I, therefore, do not wish to be limited to the precise details of construction set forth, but desire to avail myself of such variations and modifications as come within the scope of the appended claim.

Having described my invention what I claim as new and desire to secure by Letters Patent is:

A splitting machine comprising a cutting element consisting of two sets of blades, each set consisting of a plurality of blades having radially disposed cutting edges, said sets of blades being relatively rotatably adjustable; and means for pressing a piece of material to be split into engagement with said blades, substantially as described.

In testimony whereof I have signed my name to this specification in the presence of two subscribing witnesses.

FRANK PETER.

Witnesses:
 Joshua R. H. Potts,
 Arthur A. Olson.

Copies of this patent may be obtained for five cents each, by addressing the "Commissioner of Patents, Washington, D. C."